7230X
J. ATWATER.
FIRE GRATE FOR STOVES.
Patented Oct. 25, 1832.
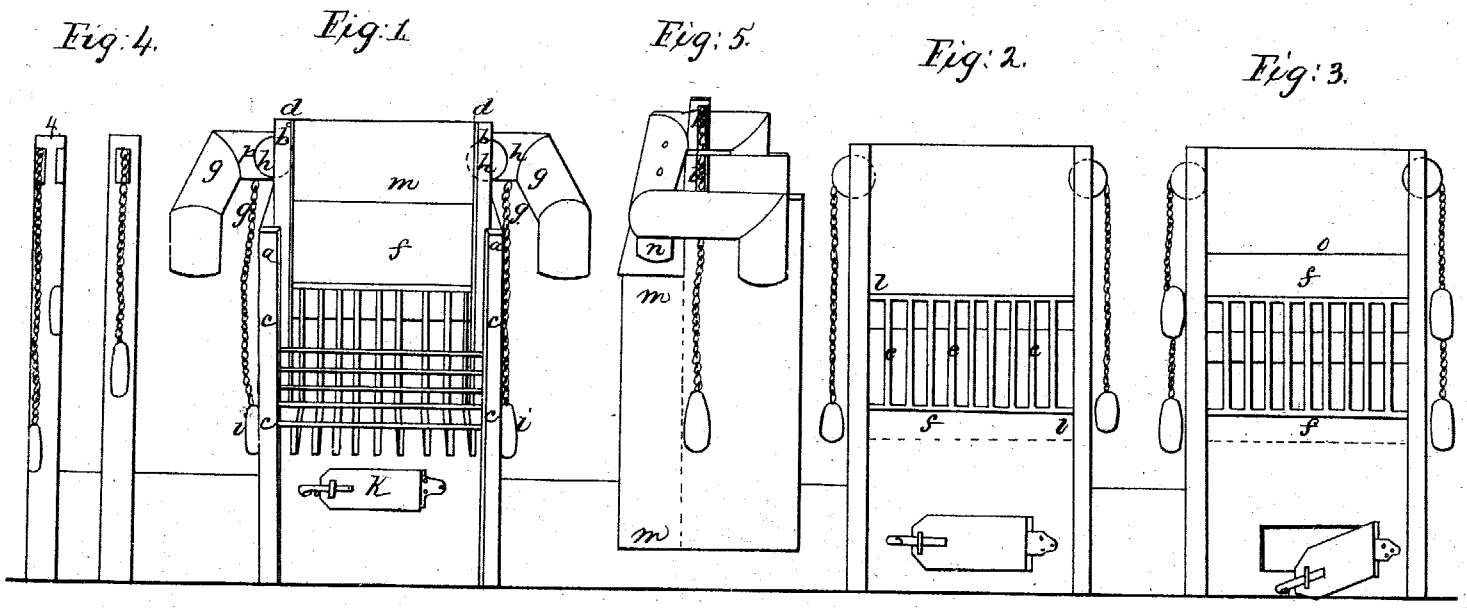
THE NORRIS PETERS CO., PHOTO-LITHO., WASHINGTON, D. C.

7230X

James Atwater
Letters Patent

The Schedule referred to in these Letters Patent and making part of the same containing a description in the words of the said James Atwater himself of his improvement in the common Fire Grate

---

To all people to whom these presents shall come. Greeting;. Know Ye that I James Atwater of the City & County of New Haven State of Connecticut have invented constructed & applied to use a new & useful improvement in the common grate used for burning coal & commonly set in fire places or stoves. which improvement & invention I specify & describe as follows. Take two pieces of iron or other suitable metal marked in the annexed drawing fig 1 a,a. from 30 to 40 inches in length according to the height of the fire place in which the grate is to be set & about one inch square & with them connect a grate as at figs C,C,C,C, made according to the common method or somewhat smaller in size height form & materials & so that these pieces of metal shall form the upright supporters of the said grate in front. Then for the back part of the improved grate take two other pieces of the same metal Fig. 1 b,b, & about an inch by an inch & a half in size & about 6 or 9 inches longer than the front pieces. above described or long enough to suspend the grate hereafter mentioned & give room for it to be moved up & down as far as required. And in each one make one or two channels or grooves fig. 1 d. d, from one third to one half of an inch in width & extending from the top nearly the whole length of the pieces & then connect them so that the grooves shall face each other & not be obstructed & so as to form the back part of the grate which is to be constructed of bars of metal or soap stone or fire brick or other substance (fig 2,2,2, C.C.) which will bear the action of a high degree of heat & these bars or pieces may be arranged perpendicularly or horizontally at pleasure & at suitable distances from each other greater or less according as a greater or less rapid draught is requir-ed

[illegible]

ed. & according to the size of the grate & so many of them must be used
& of such length that the space they shall occupy will a little exceed the
height & nearly or quite equal the width of the front of the grate or that
part which contains the fuel. The front pair of upright pieces fig 1, a, a, &
the back pair fig 1 b, b, may be also connected with a piece of the same met-
al placed at the bottom of the grate fig 1, c, c, & of a suitable size & shape to
support the sides of that part of the grate which is to contain the fuel.
The sides of the grate or that part which contains the fuel are to be form
ed of fire-brick soap stone or other suitable material commonly used for
the sides of a coal grate & supported as above mentioned. And if prefer-
red the upright pieces may be made so wide as to present an uniform
surface on the sides of the grate when the whole is completed as next
mentioned. The residue of the sides above & below the part which con-
tains the fuel are to be made of common brick or sheet iron copper, tin,
or other suitable metal or soap stone or any such like material. And
in order to regulate the draught of the grate, next fit a slide or gate (fig 1, f)
made of a piece of soap-stone or iron or other suitable material to bear
the action of a considerable degree of heat so that it will easily move up
& down in the grooves (fig 1, a, a,) made in the upright pieces (fig 1, b, b,)
which slide or gate must be of such length & width as to cover the whole
of the open part of the back of the grate (fig 2, c, c.. Then suspend this gate
or slide by means of chains at each end of it which shall pass over
pulleys or rollers (fig. 1, h, h,) placed at the top of the pieces (fig. 1, b, b,) to
which chains attach weights (fig 1, i, i,) heavy enough to balance the gate
or slide (fig. 1, f,) so that it will readily move up & down & remain station
ary wherever placed as represented in fig 1 & fig. 2, or in any other position
& in order to move it easily a small staple may be inserted as at m,
or a hole or holes formed in the gate or slide. If preferred when two
grooves are made in the pieces fig 1, b, b, then two gates or slides fig 2, f, f,
may be made with pulleys & weights for each gate or slide with a staple
or holes in each & all in the same manner as already described &
shown in fig 3 & 4. If one of the gates (f fig 2,) is made narrower than
the height of the open part of the back of the grate then by using that gate gate alone to regulate the draught. two draughts one at the top & the other
at the bottom of the grate may be obtained at the same time. The rest of the
space above & below the open back already described & between the upright
pieces (fig 1. b.b.) & quite up to the gate or slide so as merely to leave room
for the gate or slide to move freely may be filled up with brick or stone or
sheet iron or any other similar material. If the sides and back
above & below that part of the grate which holds the coal are firmly con-
nected with the upright pieces the whole grate will be portable.
If preferred, the racks or that part of the grate which supports the fuel
may be so made as to set into the whole grate & be removed when not
in use or at other times at pleasure. A small door fig 1. h, with hinges
& fastenings must be made in that part of the back which is below the
part of the grate which holds the fuel & fitted to shut closely over the open-
ing made in the back & which it is designed to cover & should be placed as
near the bottom as convenient leaving room for a coal or dust pan when
necessary. The grate is now complete when it is to be set in a fireplace
which is done by closing all the fire place but so as to leave an open air
space or chamber behind the grate & also so that no air can pass
out of the room into the flue of the chimney except thro the back of the
grate or the door below. Many advantages attend the use of a grate
so constructed some of which are that by the use of the slide or slides so as
to contract or shut off portions of the back of the grate as seen in fig. 1, 2, 3,
a larger or smaller draught can be obtained & this draught may be at
the bottom or the top or both or intermediate between the bottom and
top at pleasure. also a very small quantity of hard or anthracite coal may
be made to burn in this manner without difficulty. Also the waste of
warm air in the room which usually runs off thro' the throat of the grate
without igniting the coal is wholly or in a great measure prevented.
Also the coal may be made to burn slower or faster at pleasure by so placing
the gate or gates as to admit of the passage of the requisite quantity of air
thro' the coal. Also by wholly closing the back of the grate by the gate or
gates & opening the small door below the current of air from the room will
be made to pass downward thro' the grate & under the same thro the door
to & thus thus the dust will be carried off when the grate is cleaned or the fire
disturbed without the inconvenience which is usually experienced as very
little dust will rise or spread thro' the room. And by opening the door at any
time while the draught is passing thro' the coal the rapidity of the draught
will be slackened & the warm air of the room will be rapidly exhausted.

This grate may be constructed so as to be used in the same manner as a stove
is by forming a chamber in the rear of the grate connected to the upright
pieces (fig. 5. b,b,) at the back of the grate & open toward the back of the grate
& closed on all other sides & extending from the bottom to nearly or quite the
top of the grate as seen in fig. 5. (m, m, ) & extending back about from 3 to 6.
inches. This chamber may be made of sheet or cast iron or other metal or
of brick or stone & at the top or in some other suitable place of the chamber
a pipe (fig 5. n,) must be inserted made in the usual manner & of ordina-
ry materials & if inserted in the top as in fig 5. a horizontal pipe may
be placed (fig 5. o, o,) extending a little beyond the sides of the grate
as seen in fig 1 (p, p,) & then at each end a knee or elbow may be tur-
ned & the pipes thus formed (fig 1 q, q,) may then be turned in any di-
rection which may be wished in the usual manner. If preferred one pipe
only may be used as is usually done with stoves & in either case the pipe
or pipes must finally be conducted into a flue either in or out of the room
or into the open air as may be convenient always taking care that the
fire place or flue (if any) in the room be carefully closed so that no air
can pass out of the room into the flue except thro' the pipe or pipes.

In the pipe or pipes common dampers may be placed to aid in the regu-
lation of the draught as is now usually done in stoves with pipes. If the
room has a fire place built in the common manner the improved grate
may be placed in or near the same the pipe or pipes may be made to pass
in various directions up & down or horizontally in or near the fire place or grate
or both until as much pipe is used as is wished & then the pipe or pipes may
be made to pass into the flue as before described. If the improved grate
is placed in front of an open fire place & two pipes are formed as in (fig
1 & 5.) & when two or three turns up & down on each side of the grate & within
the fire place are given to the pipes & then they are made to pass into the flue flue thro the throat of the fire place the structure will be found to be con-
venient as it will not encumber the room & will save a great deal of
the heat. and in this case also the back & sides of the fire place may be
lined with tin or other bright metallic substance so placed as to form a
concave surface toward the grate of a semicylindrical form or in the shape
of a quarter sphere which will reflect upon the grate & into the room the
heat which radiates from the chamber pipes & grate. The whole instru-
ment may be made larger or smaller in the size & varied in the proportions
of its parts & ornamented in any manner which suits the taste or fancy of
the manufacturer or the public. If the grate is used to stand in the room
& detached from the fire place it will be convenient to cover the top of the
grate & make a suitable pan or bottom for the same & use but one pipe.
When the sides of the grate & chamber are formed of cast iron so as to con-
nect the whole firmly together. the grooves & pullies, in the gate or slide
may be placed in the cast iron sides in the same manner as heretofore
described for the posts & the posts may not then be found necessary. I claim
as part of my improvement & invention the construction of a fire grate
with several openings or flues in the back & behind the fuel combined
with a chamber in the rear of the grate & a door below the grate opening
into the chamber & claim the exclusive privilege of constructing & selling
fire grates with such a combination & arrangement of the openings or flues
the chamber & the door taken together as I have specified. And
also I further claim as my improvement & invention the construction
& adaptation of one or more gates or slides to a grate with several openings
or flues in the back thereof so as to be able to alter or change the draught
of the grate by making it draw upward or downward or horizontally
& so as to be able to close the whole or any part of the openings or flues as
may be required at pleasure & that I am entitled to the exclusive right
to regulate the draught of a grate with an open back by means of one or more
gates or slides as aforesaid. And I do not claim any other parts of the in-
strument or apparatus which I have described as my invention or im-
provement & have described the whole only that the public might be
able to understand the parts which I have improved & claim as my
invention Pat 7230X Oct 25, 1832 invention. In testimony that the above is a true specification of my said improvement as above described I have hereunto subscribed this twelfth day of July A.D. 1832.

Witnesses James Atwater

Saml Hitchcock

John Beach

26th Nov

Exd
J.H.W.